(12) United States Patent
Ek et al.

(10) Patent No.: US 9,735,713 B2
(45) Date of Patent: Aug. 15, 2017

(54) AUTOMATIC CLEANING METHOD FOR A PUMP SYSTEM COMPRISING A SOFTSTARTER ARRANGEMENT

(71) Applicant: ABB Schweiz AG, Baden (CH)

(72) Inventors: Magnus Ek, Västerås (SE); Sören Kling, Västerås (SE); Tobias Gentzell, Västerås (SE); Åsa Grönqvist, Västerås (SE); Aravindh Vishnu, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/436,729

(22) PCT Filed: Oct. 22, 2012

(86) PCT No.: PCT/EP2012/070838
§ 371 (c)(1),
(2) Date: Apr. 17, 2015

(87) PCT Pub. No.: WO2014/063722
PCT Pub. Date: May 1, 2014

(65) Prior Publication Data
US 2015/0340972 A1     Nov. 26, 2015

(51) Int. Cl.
*G05B 5/00* (2006.01)
*H02P 1/04* (2006.01)
(Continued)

(52) U.S. Cl.
CPC ............... *H02P 1/04* (2013.01); *F04D 3/00* (2013.01); *F04D 29/708* (2013.01);
(Continued)

(58) Field of Classification Search
CPC ..... H02P 1/04; H02P 1/40; F04D 3/00; F04D 29/708; G05B 19/0428
(Continued)

(56) References Cited

U.S. PATENT DOCUMENTS 5,545,012 A    8/1996   Anastos et al.
6,160,365 A   12/2000   Younger et al.
(Continued)

FOREIGN PATENT DOCUMENTS

DE   10003692 A1   8/2001
EA    011044 B1   4/2008
(Continued)

OTHER PUBLICATIONS

International Preliminary Report on Patentability Application No. PCT/EP2012/070838 Completed: Nov. 27, 2014 15 pages.
(Continued)

*Primary Examiner* — Bentsu Ro
*Assistant Examiner* — Zemenay Truneh
(74) *Attorney, Agent, or Firm* — Whitmyer IP Group LLC

(57) ABSTRACT

A method for controlling circuitry of a softstarter arrangement to operate an electric motor for driving a pump is provided, wherein the softstarter circuitry electrically connects the motor to electric mains. The method includes: (i) controlling the circuitry of the softstarter arrangement to accelerate the motor up to full speed in a forward direction; (ii) controlling the circuitry of the softstarter arrangement to decelerate the motor when the motor has run at full speed in the forward direction for a first period of time; (iii) controlling the circuitry of the softstarter arrangement to accelerate the motor up a specified speed in a reverse direction; (iv) controlling the circuitry of the softstarter arrangement to decelerate the motor when the motor has run at the specified speed in the reverse direction for a second period of time; and (v) repeating the steps (i)-(iv) one or more times.

16 Claims, 3 Drawing Sheets

(51) Int. Cl.
*F04D 3/00* (2006.01)
*F04D 29/70* (2006.01)
*G05B 19/042* (2006.01)
*H02P 1/40* (2006.01)
*H02P 1/26* (2006.01)

(52) U.S. Cl.
CPC ............ *G05B 19/0428* (2013.01); *H02P 1/40* (2013.01); *H02P 1/26* (2013.01)

(58) Field of Classification Search
USPC .......................................................... 318/446
See application file for complete search history.

(56) References Cited

U.S. PATENT DOCUMENTS

| 2003/0049134 A1 | 3/2003 | Leighton et al. |
| 2007/0248468 A1 | 10/2007 | Holmberg |
| 2009/0038696 A1* | 2/2009 | Levin ................... F04B 49/002 137/565.11 |
| 2009/0104044 A1 | 4/2009 | Koehl |
| 2010/0327790 A1* | 12/2010 | Nolemo .................... H02P 1/26 318/430 |
| 2011/0050155 A1* | 3/2011 | Balcon ..................... H02P 1/04 318/778 |
| 2011/0286859 A1* | 11/2011 | Ortiz ..................... F04B 49/002 417/20 |
| 2015/0180377 A1* | 6/2015 | Hua .......................... H02P 1/04 318/778 |

FOREIGN PATENT DOCUMENTS

| GB | 2487623 | * | 1/2012 |
| GB | 2487623 A | | 8/2012 |
| RU | 18027 U1 | | 5/2001 |
| WO | 9509981 A1 | | 4/1995 |
| WO | 2011057660 A1 | | 5/2011 |

OTHER PUBLICATIONS

International Search Report and Written Opinion of the International Searching Authority Application No. PCT/EP2012/070838 Completed: Jun. 13, 2013; Mailing Date: Jun. 20, 2013 9 pages.

* cited by examiner

AUTOMATIC CLEANING METHOD FOR A PUMP SYSTEM COMPRISING A SOFTSTARTER ARRANGEMENT

TECHNICAL FIELD

The present invention relates to a method, a computer program, and a computer program product for controlling circuitry of a softstarter arrangement to operate an electric motor for driving a pump, to a softstarter arrangement for operating an electric motor for driving a pump, and to a pump system comprising a softstarter arrangement

DESCRIPTION OF RELATED ART AND BACKGROUND OF THE INVENTION

Pump users have always looked for ways of reducing operating costs. A significant amount of the life cycle cost is due to poor efficiency, unexpected downtime, and maintenance.

In a pump system, which may be used for pumping water or waste water in various installations the operation of the pump is controlled by a softstarter. Problems that may arise in such a system include jammed pumps and clogged pipes. Jamming occurs when a semi large solid object like a piece of plastic or wood gets stuck in the pump blades of a pump. Clogging occurs when the liquid that is pumped contains small particles and effluent, which will over time settle and become permanently attached to the interior walls of the pipes and cause liquid flow problems. Both jamming and clogging reduce the pump efficiency and may over time even lead to the pump being damaged.

SUMMARY

Solutions to the problem include manual labor or the use of frequency converter controlled pumps configured to perform pump cleaning automatically. However, such solutions seem to be labor intensive, complex, and/or costly. For softstarter controlled electric motors, no currently available solution to the problem seems attractive.

It is therefore an object of the present invention to provide a method for controlling circuitry of a softstarter arrangement to operate an electric motor for driving a pump, by which at least some of the above-mentioned problems and drawbacks can be mitigated and thereby perform preventive maintenance.

It is a further object of the invention to provide such a method, which is reliable, easy to use, accurate, precise, efficient, of low cost, and easy to implement.

It is a further object of the present invention to provide a computer program and a computer program product for carrying out a method fulfilling the above-mentioned objects.

It is a further object of the present invention to provide a softstarter arrangement for operating an electric motor for driving a pump, wherein the softstarter arrangement includes a control device capable of carrying out a method fulfilling the above-mentioned objects.

It is a further object of the present invention to provide a pump system comprising a softstarter fulfilling the above-mentioned objects.

These objects, among others, are attained by the methods, the computer program, the computer program product, the softstarter arrangements, and the pump system as defined in the appended patent claims.

In one aspect, there is provided a method for controlling circuitry of a softstarter arrangement to operate an electric motor for driving a pump, wherein the circuitry electrically connects the motor to electric mains. The method comprises (i) controlling the circuitry of the softstarter arrangement to accelerate the motor up to full speed in a forward direction; (ii) controlling the circuitry of the softstarter arrangement to decelerate the motor when the motor has run at full speed in the forward direction for a first period of time; (iii) controlling the circuitry of the softstarter arrangement to accelerate the motor up to a specified speed in the reverse direction; and (iv) controlling the circuitry of the softstarter arrangement to decelerate the motor when the motor has run at the specified speed in the reverse direction for a second period of time, wherein the steps (i)-(iv) are repeated one or more times. The motor may be kept de-energized for some time between each deceleration in one direction and a following acceleration in the opposite direction.

By means of the above-mentioned aspect, unwanted solid objects in the pump system, in which the motor is comprised, are effectively cut by the pump blades and effluent residue are flushed away. The solution is of low cost and automatic cleaning can still be performed while using a softstarter for controlling the normal operation of the motor.

Hereby, it can be assured that the pump efficiency is increased and the risk over time of damaging the pump is reduced.

While the method can be performed automatically, e.g. in response to an automatically received or measured set of parameters related to the operation of the motor and/or indicating that the motor is not operating efficiently, e.g. due to a jammed or clogged condition in the pump system, in which the motor is comprised, it can alternatively be performed in response to a manual operator command received from an operator of the pump system.

In one embodiment, the motor is a three phase motor, electrically connected to the three phases of the electric mains and the softstarter arrangement is a two-phase or three-phase softstarter arrangement configured to operate the motor, and the steps (iii) and (iv) above, i.e. controlling the circuitry of the softstarter arrangement to operate the pump in the reverse direction, can be preceded by shifting the electric connections of two of the three phases of the mains to the three phase motor, and are followed by shifting back the electric connections of the same two phases of the mains to the three phase motor.

The shifting and shifting back may be performed by means of operating two line contactors interconnected between the mains and the circuitry of the softstarter arrangement.

Hereby, a simple, and robust control method is provided, which enables the speed in the reverse direction to be similar to the full speed in the forward direction.

In another embodiment, the steps (iii) and (iv) above, i.e. controlling the circuitry of the softstarter arrangement to operate the pump in the reverse direction can be performed by means of controlling the circuitry of the softstarter arrangement to operate in slow speed mode, a functionality which is typically offered by some of the softstarters commercially available today. The slow speed mode may enable the speed in the reverse direction to be up to about ⅓ of the full speed in the forward direction.

Hereby, a simple, cost efficient, and robust control method is provided, which does not require the provision and use of two external line contactors.

In yet an other embodiment the steps (iii) and (iv) above, i.e. controlling the circuitry of the softstarter arrangement to operate the pump in the reverse direction, can be performed by means of controlling the circuitry of the softstarter arrangement using vector flow control, optionally using electromagnetic torque estimation and proportional plus integral (PI) regulation.

Hereby, a control method is provided, which enables the speed in the reverse direction to be similar to the full speed in the forward direction, and which does not require the provision and use of two external line contactors. For the motor to follow a pre-defined reference cleaning cycle, a closed loop control can thus be implemented, where the thyristor fire angles are regulated by applying an accurately estimated electromagnetic torque as feedback.

In another aspect, there is provided a softstarter arrangement for operating an electric motor for driving a pump comprising circuitry that electrically connects the motor to electrical mains and a control device including a processor, a computer program, and storage means, in which the computer program is stored.

The computer program comprises instructions that, when executed by the processor, cause the control device to (i) control the circuitry of the softstarter arrangement to accelerate the motor up to full speed in a forward direction; (ii) control the circuitry of the softstarter arrangement to decelerate the motor when the motor has run at full speed in the forward direction during a first period of time; (iii) control the circuitry of the softstarter arrangement to accelerate the motor up to a specified speed in the reverse direction; (iv) control the circuitry of the softstarter arrangement to decelerate the motor when the motor has run at the specified speed in the reverse direction during a second period of time; and (v) repeat the steps (i)-(iv) one or more times.

In yet another aspects, the above disclosed computer program; a computer program product comprising the computer program and computer storage means, on which the computer program is stored; and a pump system comprising the above disclosed softstarter arrangement are provided.

Further characteristics of the invention and advantages thereof, will be evident from the detailed description of preferred embodiments of the present invention given hereinafter and the accompanying FIGS. 1-3, which are given by way of illustration only and thus, are not limitative of the present invention.

DETAILED DESCRIPTION

Figure 1:
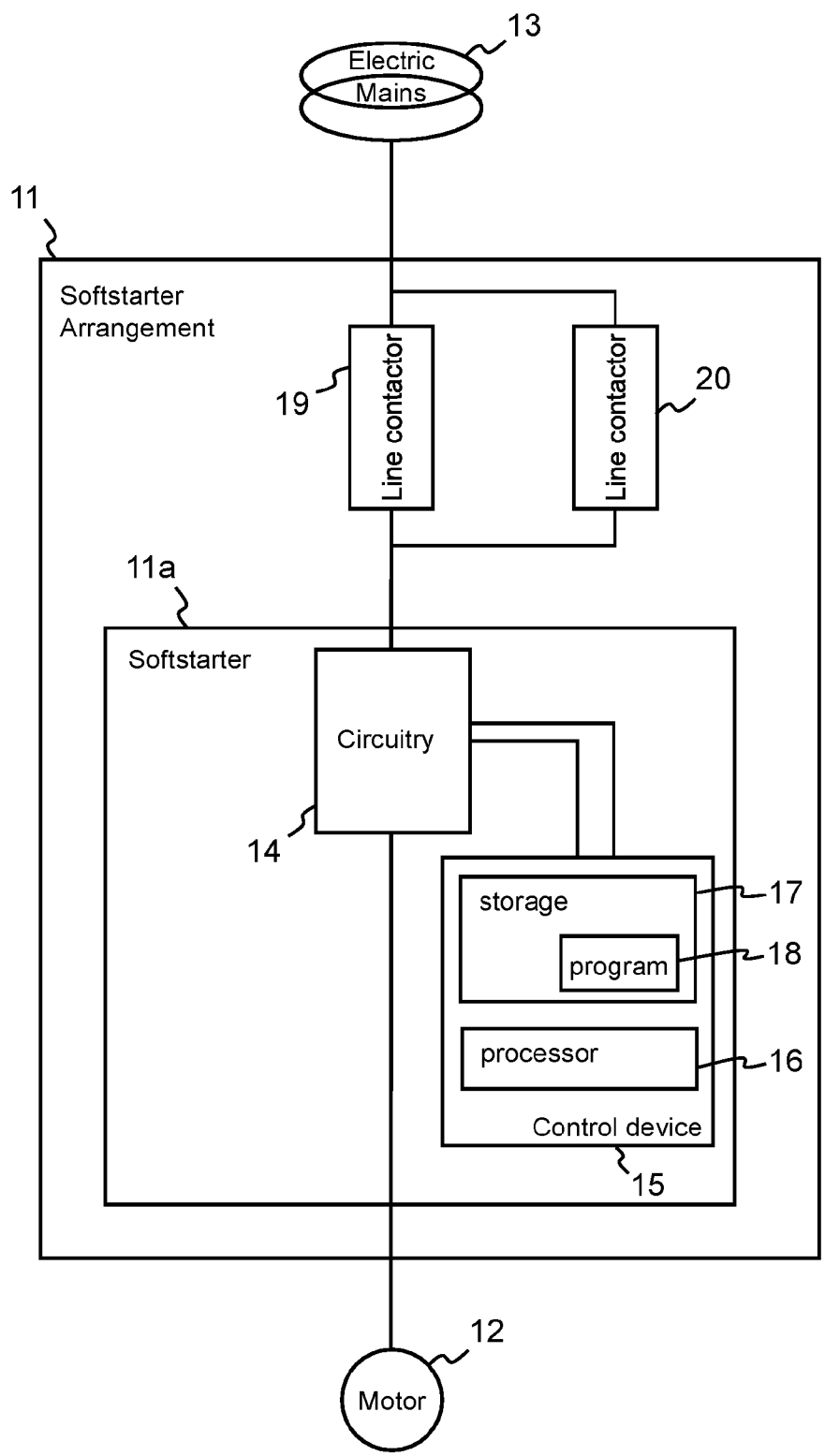
FIG. 1 illustrates schematically main components of a softstarter arrangement electrically connecting an electric motor for driving a pump to electric mains.

FIG. 1 schematically illustrates the main components of a softstarter arrangement 11 electrically connecting an electric motor for driving a pump 12 to electric mains 13. The softstarter arrangement 11 comprises a softstarter 11a and two optional line contactors 19 and 20.

The softstarter 11a comprises in turn circuitry 14 and a control device 15. The circuitry 14 is electrically connected between the motor 12 and the electric mains 13 and comprises typically an AC/AC converter including a number of lines, which corresponds to the number of phases of the motor 12 and the electric mains 13. Each line comprises typically unidirectional semiconductor switches, such as e.g. thyristors, connected in anti-parallel as well as sensors for measuring the three-phase voltages and currents. The circuitry 14 can be electrically connected to the motor 12 in in-line or inside-delta configuration.

The control device 15 is operatively connected to the circuitry 14 and includes a processor 16, storage means 17, and a computer program 18, which is stored in the storage means 17. The control device 15 receives the sensed voltages and/or currents from the sensors and controls the unidirectional semiconductor switches so that they are switched on or fired in response to the sensed voltages and/or currents. The switching controls the voltage and the current provided to the motor 12, thereby generating electromagnetic torque in the motor 12.

The control device 15 may be formed on a single or multiple printed circuit boards. The storage means 17 may be separate from the processor 16 or they may be integrated into single chip microcontroller.

It shall be appreciated that the circuitry 14 may alternatively, or additionally, comprise or be connected to other components for sensing or determining parameters related to the electric field in the motor 12.

Figure 2:
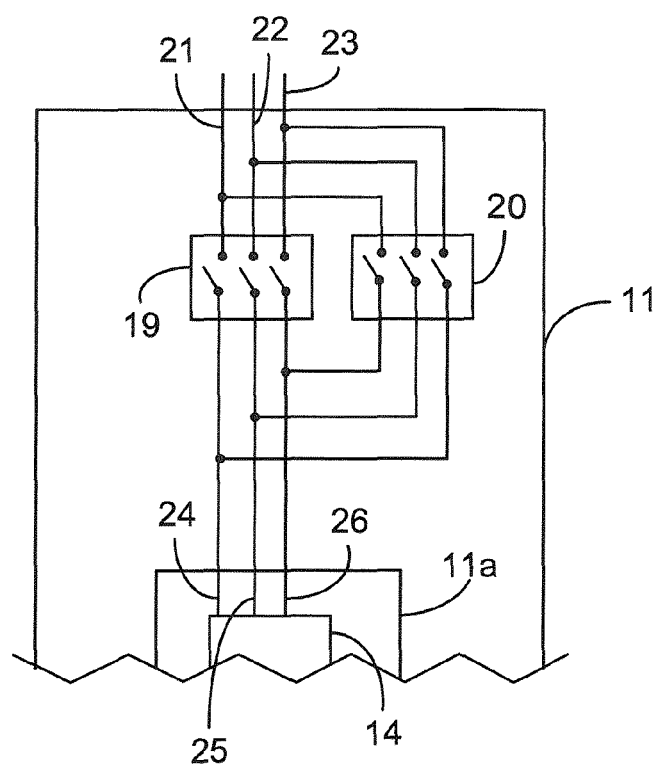
FIG. 2 illustrates schematically some components of a three-phase softstarter arrangement, wherein the connection of two line contactors of the three-phase softstarter arrangement is emphasized.

FIG. 2 illustrates schematically some components of a three-phase softstarter arrangement 11, wherein the connection of two line contactors 19 and 20 of the three-phase softstarter arrangement 11 is emphasized. It can be seen that when the line contactor 19 is closed and the line contactor 20 is open, the three phases 21, 22, 23 of the electric mains 13 are electrically connected to the three line 24, 25, 26 of the circuitry 14 of the softstarter 11a, i.e., phase 21 is connected to line 24, phase 22 is connected to line 25, and phase 22 is connected to line 25. When the line contactor 20 is closed and the line contactor 19 is open, the electric connections of two 21, 23 of the three phases 21, 22, 23 of the electric mains 13 to the circuitry 14 of the softstarter 11a are shifted, i.e. phase 21 is connected to line 26, phase 22 is connected to line 25, and phase 22 is connected to line 24. The two line contactors 19 and 20 of the three-phase softstarter arrangement 11 should never be closed at the same time. While FIG. 2 gives an example only, the line contactors may be arranged to reverse any two of the three phases.

Hereby, the softstarter arrangement 11 can be arranged to operate the motor 12 at the full speed both in the forward direction (line contactor 19 closed and line contactor 20 open) and reverse direction (line contactor 20 closed and line contactor 19 open). The operation of the two line contactors 19 and 20 is automatically controlled by the control device 15. To this end, the control device 15 is operatively connected to the line contactors 19 and 20.

Alternatively, there is provided digital inputs to allow the softstarter arrangement 11 to operate the motor 12 at the full speed in the forward direction or in the reverse direction in response to manual operator commands received from an operator of the pump system, in which the motor 12 is comprised.

Alternatively, or additionally, the softstarter 11 comprises functionality to allow it to be run in slow speed mode in the reverse direction, thereby enabling the motor 12 to be run in the reverse direction at a speed up to about ⅓ of the full speed in the forward direction. Such slow speed mode functionality is offered in commercially available softstarters.

Alternatively, or additionally, the softstarter 11a comprises functionality to allow the control device 15 to control the circuitry 14 of the softstarter 11a using vector flow control, optionally using electromagnetic torque estimation and proportional plus integral (PI) regulation, thereby enabling the motor 12 to be run in the reverse direction at a speed similar to the full speed in the forward direction.

Vector flow control is disclosed in a patent application WO 2011/057660 A1, wherein a method for generating electromagnetic torque of desired sign and adjustable value under minimal hardware knowledge especially suitable for softstarter driven induction motors is disclosed. The content of said publication is hereby incorporated by reference.

The motor 12 is comprised in a pump system, which may be used for pumping water or waste water in various installations. Problems that may arise in such systems include jammed pumps and clogged pipes. Jamming occurs when a semi large solid object like a piece of plastic or wood gets stuck in the pump blades of a pump. Clogging occurs when the liquid that is pumped contains small particles and effluent, which will over time settle and become permanently attached to the interior walls of the pipes and cause liquid flow problems which may over time damage the pump.

The softstarter arrangement 11 may comprise, or be operatively connected, to various sensing means for sensing conditions caused by jamming and dogging. These sensing means may include means for sensing electrical parameters related to the motor 12 or the softstarter arrangement 11 itself and/or external sensing means for sensing parameters related to the flow of liquid, the pipes, and/or the pump.

Generally, the storage means 17 or any other memory may store the computer program 18, which may comprise computer program code or instructions that, when executed by the processor 16, cause the control device 15 to execute any of the methods disclosed below.

Figure 3:
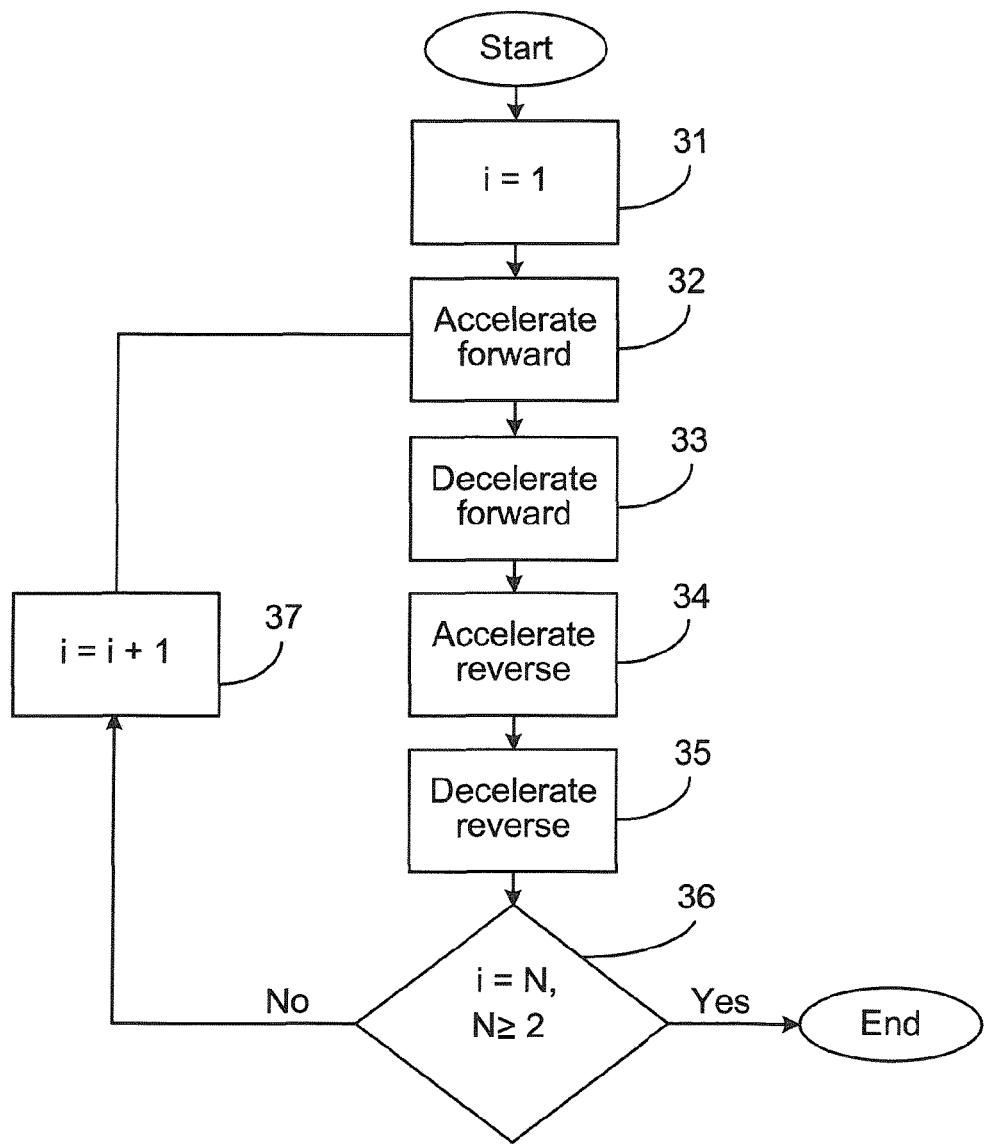
FIG. 3 is a flow scheme of a method for controlling circuitry of a softstarter arrangement to operate an electric motor for driving a pump.

FIG. 3 is a flow scheme of a method or algorithm for controlling circuitry of a softstarter arrangement to operate an electric motor for driving a pump, e.g. the circuitry 14 of the softstarter arrangement 11 disclosed above, in order to clean the pump. By means of the method, unwanted solid objects in the pump system, in which the motor is comprised, are effectively cut by the pump blades and effluent residue is flushed away from the interior walls of the pipes.

A variable i is, in a step 31, set to one, and the circuitry of the softstarter arrangement is, in a step 32, controlled to start or accelerate the motor up to full speed in a forward direction. This is achieved by applying an ordinary voltage ramp (with short ramp time) to start the motor softly, but fast up to the full voltage and speed. The motor is run at full speed for a first period of time.

Next, the circuitry of the softstarter arrangement is, in a step 33, controlled to brake or decelerate the motor when the motor has run at full speed in the forward direction for the first period of time.

Then, the circuitry of the softstarter arrangement is, in a step 34, controlled to start or accelerate the motor up to a specified speed in a reverse direction. The motor is run at this speed in the reverse direction for a second period of time.

Thereafter, the circuitry of the softstarter arrangement is, in a step 35, controlled to brake or decelerate the motor when the motor has run at the specified speed in the reverse direction for the second period of time.

The algorithm is continued by checking whether the variable i is equal to N, where N is a set positive integer equal to or higher than two.

If i=N (which cannot be the case yet since the variable i was initially set to 1 in step 31), the algorithm is ended. If not, the variable i is, in a step 37, incremented with one, and the algorithm is returned to step 32, and the steps 32-36 are repeated. If N is equal to two, the algorithm will end after this, but if N is higher, the steps 37 and 32-36 will be repeated until the variable i is equal to N. The variable i thus denotes the current cleaning cycle and N denotes the number of cleaning cycles which are to be performed. N may be between two and five or higher.

In step 33, the circuitry of the softstarter arrangement may be controlled to decelerate the motor to a de-energized state, which may correspond to the motor being stand still, and in step 34, the circuitry of the softstarter arrangement may be controlled to accelerate the motor up to a specified speed in the reverse direction only when the motor has been de-energized for a period of time.

Similarly, in step 35, the circuitry of the softstarter arrangement may be controlled to decelerate the motor to a de-energized state and in step 31, the circuitry of the softstarter arrangement may be controlled to accelerate the motor up to the full speed in the forward direction only when the motor has been de-energized for a period of time.

Each period of time, at which the motor is running at constant speed or is de-energized s, may be between 0.5 and 60, or one and five, or one and ten, seconds.

The algorithm may be performed in response to one or more manual operator command(s) received from an operator of a pump system, in which the motor is comprised. For instance, manual commands may determine how many cleaning cycles that are to be performed, and optionally how they should be performed in detail (e.g. ramps, times, and speeds), and a further manual command initiates the cleaning method to be performed.

Yet alternatively, the method may be performed automatically e.g. in response to an automatically received or measured set of parameters related to the operation of the motor, e.g. in response to an automatically received or measured set of parameters indicating that the motor is not operating efficiently, e.g. due to a jammed or clogged condition in the pump system, in which the motor is comprised.

Still alternatively, the method may be performed automatically e.g. in response to a maintenance scheme.

Further, the method may be performed with different settings (e.g. ramps, times, speeds, no of cycles) different times or in response to different conditions.

In one embodiment, the motor is a three phase motor electrically connected to three phases of the electric mains and the softstarter arrangement is a three-phase softstarter arrangement configured to operate the three phase motor, e.g. as disclosed in FIG. 2. The steps 34 and 35 (e.g. controlling the circuitry of the softstarter arrangement to operate the motor in the reverse direction) may be preceded by shifting the electric connections of two of the three phases of the mains to the three phase motor and may be followed by shifting back the electric connections of the same two phases of the mains to the three phase motor. The shifting and shifting back may be performed by means of operating two line contactors interconnected between the three phase mains and the circuitry of the softstarter arrangement, such as the line contactors 19 and 20 illustrated in FIG. 2.

The use of line contactors to obtain full speed in the reverse direction in accordance with the invention may be employed with either two-phase softstarters or three-phase softstarters.

Here, the motor speed in the reverse direction may be similar to the full speed in the forward direction.

In another embodiment, the steps 34 and 35 may be performed by means of controlling the circuitry of the softstarter arrangement to operate in slow speed mode as is disclosed above. Here, the motor speed in the reverse direction may be up to about ⅓ of the full speed in the forward direction.

In yet another embodiment, the steps 34 and 35 may be performed by means of controlling the circuitry of the softstarter arrangement using vector flow control, optionally using electromagnetic torque estimation and proportional plus integral (PI) regulation. The magnetic flux and the motor current may be determined continuously in order to determine the time instances, at which the thyristors should be fired in order for the motor to generate only positive electromagnetic torque, or only negative electromagnetic torque, motor depending on whether the motor should be run in the forward or reverse direction.

Here, the motor speed in the reverse direction may be similar to the full speed in the forward direction.

It shall be appreciated that the best pump cleaning will be obtained if the motor speed is high in both the forward and the reverse directions, and if aggressive ramping is applied (i.e. fast acceleration and deceleration of the motor). To this end, it may be beneficial if the softstarter that is to be used for a certain application is over dimensioned with regards to the current conducting capability.

The invention relates also to a computer program product which may comprise the computer program 18 disclosed above and computer storage means on which the computer program 18 is stored, to a server which enables the computer program to be downloaded, as well as to the computer program 18 itself.

The invention claimed is:

1. A method for controlling circuitry of a softstarter arrangement to operate an electric motor provided for driving a pump in a pump system, the circuitry electrically connecting the motor to electric mains, the method comprising the steps of:
   (i) controlling the circuitry of the softstarter arrangement to accelerate the motor up to full speed in a forward direction;
   (ii) controlling the circuitry of the softstarter arrangement to decelerate the motor when the motor has run at full speed in the forward direction for a first period of time;
   (iii) controlling the circuitry of the softstarter arrangement to accelerate the motor up to a specified speed in a reverse direction;
   (iv) controlling the circuitry of the softstarter arrangement to decelerate the motor when the motor has run at the specified speed in the reverse direction for a second period of time; and
   (v) repeating the steps (i)-(iv) one or more times, wherein the steps (i)-(v) are configured to cut unwanted solid objects in the pump system by pump blades of the pump and flush away effluent residues;
   wherein the motor is a three phase motor electrically connected to three phases of the mains and the softstarter arrangement is a two-phase or three-phase softstarter arrangement configured to operate the three phase motor, and wherein the steps (iii) and (iv) are preceded by shifting the electric connections of two of the three phases of the mains to the three phase motor and are followed by shifting back the electric connections of said two of the three phases to the three phase motor, thereby providing the specified speed in the reverse direction to be similar to the full speed in the forward direction, the shifting and shifting back being performed by means of operating two line contactors interconnection between the mains and the circuitry of the softstarter arrangement.

2. The method of claim 1 wherein the step (ii) further comprises controlling the circuitry of the softstarter arrangement to decelerate the motor when the motor has run at full speed in the forward direction for the first period of time to a de-energized state; and the step (iii) further comprises controlling the circuitry of the softstarter arrangement to accelerate the motor up to the specified speed in the reverse direction when the motor has been de-energized for a third period of time.

3. The method of claim 1 wherein the step (iv) further comprises controlling the circuitry of the softstarter arrangement to decelerate the motor when the motor has run at the specified speed in the reverse direction for the second period of time to a de-energized state; and step (v) further comprises repeating the step (i) such that the circuitry of the softstarter arrangement is controlled to accelerate the motor up to full speed in the forward direction when the motor has been de-energized for a fourth period of time.

4. The method of claim 1 wherein each period of time is between 0.5 and 60 seconds.

5. The method of claim 4 wherein each period of time is between one and ten seconds.

6. The method of claim 1 wherein the steps (i)-(v) are performed in response to a manual operator command received from an operator of the pump system.

7. The method of claim 1 wherein the steps (i)-(v) are performed automatically in response to an automatically received or measured set of parameters related to operation of the motor.

8. The method of claim 1 wherein the steps (i)-(v) are performed automatically in response to an automatically received or measured set of parameters indicating that the motor is operating inefficiently due to a jammed or clogged condition in the pump system.

9. The method of claim 1 wherein the steps (iii) and (iv) are performed by means of controlling the circuitry of the softstarter arrangement to operate in slow speed mode, the slow speed mode providing the specified speed in the reverse direction to be up to about ⅓ of the full speed in the forward direction.

10. The method of claim 1 wherein the steps (iii) and (iv) are performed by means of controlling the circuitry of the softstarter arrangement using vector flow control, the vector flow control providing the specified speed in the reverse direction to be similar to the full speed in the forward direction.

11. The method of claim 10 wherein using the vector flow control includes using electromagnetic torque estimation and proportional plus integral regulation.

12. A non-transitory computer program for controlling circuitry of a softstarter arrangement to operate an electric motor for driving a pump, the computer program comprising computer program code which, when run on a processor of a control device, causes the processor to execute the method as claimed in claim 1.

13. A softstarter arrangement comprising circuitry and a control device configured to perform the method as claimed in claim 1.

14. A computer program product for controlling circuitry of a softstarter arrangement to operate an electric motor for driving a pump in a pump system, the circuitry electrically connecting the motor to electric mains, the computer program product comprising:
- a non-transitory computer storage means storing a computer program;
- the computer program comprising computer program code which, when run on a processor of a control device, causes the processor to execute the steps of:
  - (i) controlling the circuitry of the softstarter arrangement to accelerate the motor up to full speed in a forward direction;
  - (ii) controlling the circuitry of the softstarter arrangement to decelerate the motor when the motor has run at full speed in the forward direction for a first period of time;
  - (iii) controlling the circuitry of the softstarter arrangement to accelerate the motor up to a specified speed in a reverse direction;
  - (iv) controlling the circuitry of the softstarter arrangement to decelerate the motor when the motor has run at the specified speed in the reverse direction for a second period of time; and
  - (v) repeating the steps (i)-(iv) one or more times, wherein the steps (i)-(v) are configured to cut unwanted solid objects in the pump system by pump blades of the pump and flush away effluent residues;
- wherein the motor is a three phase motor electrically connected to three phases of the mains and the softstarter arrangement is a two-phase or three-phase softstarter arrangement configured to operate the three phase motor, and wherein the steps (iii) and (iv) are preceded by shifting the electric connections of two of the three phases of the mains to the three phase motor and are followed by shifting back the electric connections of said two of the three phases to the three phase motor, thereby providing the specified speed in the reverse direction to be similar to the full speed in the forward direction, the shifting and shifting back being performed by means of operating two line contactors interconnection between the mains and the circuitry of the softstarter arrangement.

15. A softstarter arrangement provided for operating an electric motor arranged to drive a pump in a pump system, the softstarter arrangement comprising:
- circuitry and a control device that includes a processor and storage means storing a computer program, the circuitry electrically connecting the motor to electric mains, wherein the computer program comprises instructions that, when executed by the processor, cause the control device to:
  - (i) control the circuitry of the softstarter arrangement to accelerate the motor up to full speed in a forward direction;
  - (ii) control the circuitry of the softstarter arrangement to decelerate the motor when the motor has run at full speed in the forward direction during a first period of time;
  - (iii) control the circuitry of the softstarter arrangement to accelerate the motor up to a specified speed in a reverse direction;
  - (iv) control the circuitry of the softstarter arrangement to decelerate the motor when the motor has run at the specified speed in the reverse direction during a second period of time; and
  - (v) repeat the steps (i)-(iv) one or more times, wherein the steps of (i)-(v) are configured to cut unwanted solid objects in the pump system by pump blades of the pump and flush away effluent residues;
- wherein the motor is a three phase motor electrically connected to three phases of the mains and the softstarter arrangement is a two-phase or three-phase softstarter arrangement configured to operate the three phase motor, and wherein the steps (iii) and (iv) are preceded by shifting the electric connections of two of the three phases of the mains to the three phase motor and are followed by shifting back the electric connections of said two of the three phases to the three phase motor, thereby providing the specified speed in the reverse direction to be similar to the full speed in the forward direction, the shifting and shifting back being performed by means of operating two line contactors interconnection between the mains and the circuitry of the softstarter arrangement.

16. A pump system comprising:
a pump,
an electric motor configured to drive the pump, and
a softstarter arrangement configured to operate the motor, the softstarter arrangement having circuitry and a control device that includes a processor and storage means storing a computer program, the circuitry electrically connecting the motor to electric mains, wherein the computer program comprises instructions that, when executed by the processor, cause the control device to:
- (i) control the circuitry of the softstarter arrangement to accelerate the motor up to full speed in a forward direction;
- (ii) control the circuitry of the softstarter arrangement to decelerate the motor when the motor has run at full speed in the forward direction during a first period of time;
- (iii) control the circuitry of the softstarter arrangement to accelerate the motor up to a specified speed in a reverse direction;
- (iv) control the circuitry of the softstarter arrangement to decelerate the motor when the motor has run at the specified speed in the reverse direction during a second period of time; and
- (v) repeat the steps (i)-(iv) one or more times, wherein the steps of (i)-(v) are configured to cut unwanted solid objects in the pump system by pump blades of the pump and flush away effluent residues;
wherein the motor is a three phase motor electrically connected to three phases of the mains and the softstarter arrangement is a two-phase or three-phase softstarter arrangement configured to operate the three phase motor, and wherein the steps (iii) and (iv) are preceded by shifting the electric connections of two of the three phases of the mains to the three phase motor and are followed by shifting back the electric connections of said two of the three phases to the three phase motor, thereby providing the specified speed in the reverse direction to be similar to the full speed in the forward direction, the shifting and shifting back being performed by means of operating two line contactors interconnection between the mains and the circuitry of the softstarter arrangement.

* * * * *